United States Patent Office 3,563,718
Patented Feb. 16, 1971

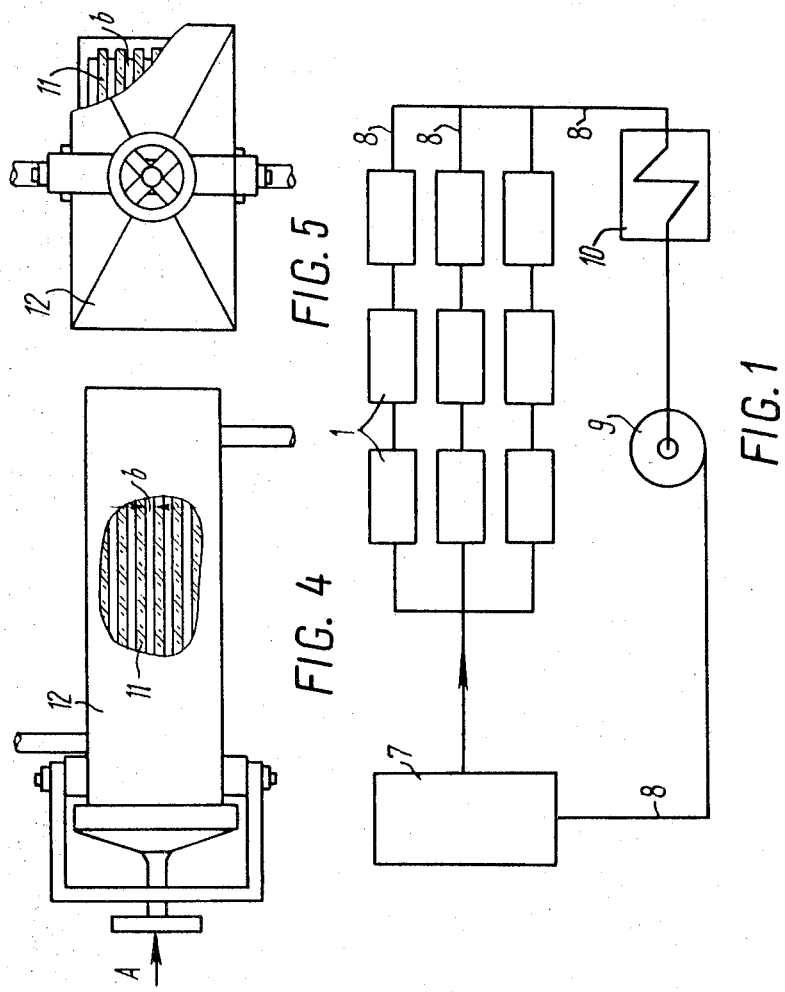

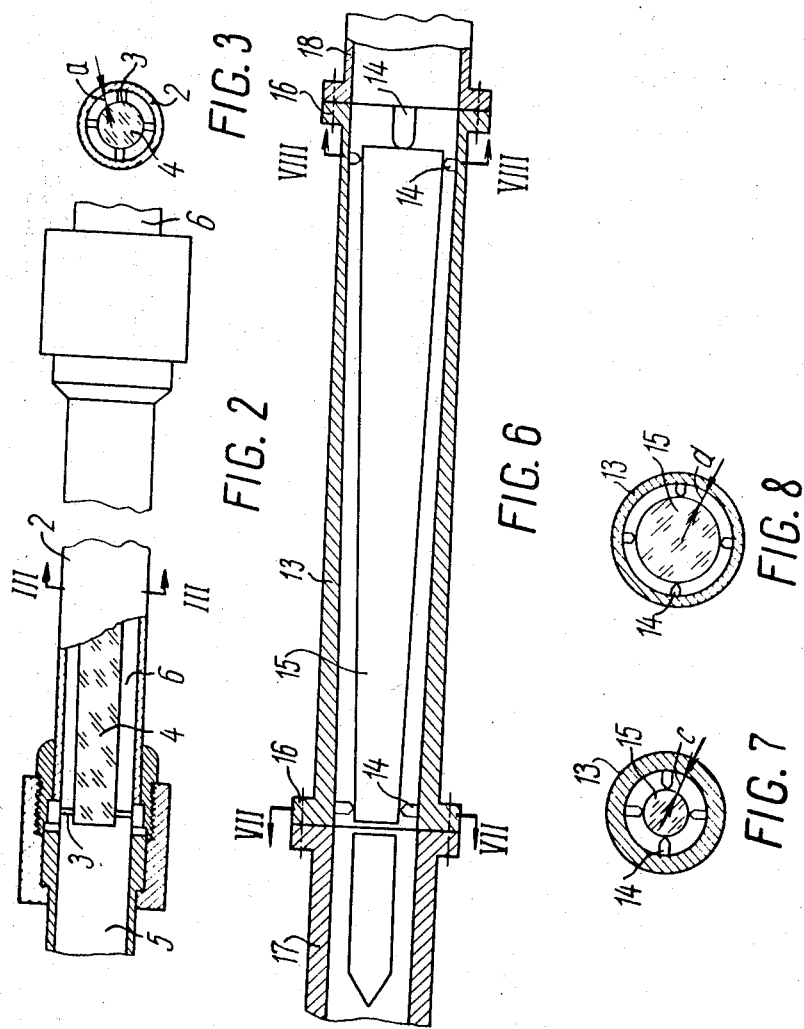

3,563,718
METHOD OF SURFACE TREATMENT OF GLASS PRODUCTS
Adomas Bolyaus Paplauskas, Strelbischensky pereulok 27, kv. 12; Vadim Alexandrovich Ryabov, Pushkinskaya ulitsa 7/5, kv. 37; Nikolai Ivanovich Semenov, Ulitsa Panferova 8, kv. 141; Vladimir Vasilievich Anisimov, Ulitsa Donskaya 28/32, kv. 120; Alexandr Kazimirovich Katarzhis, Astrodamskaya ulitsa 4, vl. 16; Vsevolod Vasilievich Polyakov, Vorontsovskaya ulitsa 27/35, kv. 62; and Antonina Ivanovna Samokhvalova, Nizhegordskaya ulitsa 11b, kv. 50, all of Moscow, U.S.S.R.
Filed May 7, 1969, Ser. No. 822,406
Int. Cl. C03b 27/00
U.S. Cl. 65—61         6 Claims

ABSTRACT OF THE DISCLOSURE

A method of surface treatment of glass products adapted for producing high-strength glass articles with a transparent or light-diffusing surface by the use of simple techniques and readily available cheap equipment by placing the glass articles into a chamber with a clearance between the treated surface of the article and the inside surface of the chamber and passing a water or steam-water stream through this chamber for 5 minutes past the article.

---

The present invention relates to the methods of surface treatment of glass products used in industry with a view to strengthening glass or producing a light-diffusing surface of the products.

Known in the art is a method of surface treatment of glass products for improving their strength or producing a light-diffusing surface consisting in etching the products in a solution of hydrofluoric acid. The glass products are dipped into a hydrofluoric acid solution bath, the solution in it being stirred either mechanically or by means of bubbling compressed air (see the U.S.S.R. authors' certificates Nos. 140,965, 146,930, 101,517, 103,708, Cl. C03c).

This method is characterized by the following disadvantages: ill effects on the health of the operating personnel due to the toxic properties of hydrofluoric acid, as well as, an excessively large amount of labour involved in the technological process. Besides, this method cannot prevent completely the precipitation of the reaction products on the surface of the glass and thus cannot ensure uniform etching of the entire surface.

An object of the present invention resides in the elimination of the aforesaid disadvantages.

The main object of the invention is to provide a method of surface treatment of glass products which would allow the production of high-strength glass products with transparent or light-diffusing surfaces using simple techniques and cheap, readily available equipment.

This object is carried into effect by surface-treating glass products placed into a chamber with a certain clearance, the inside surface of said chamber is so made that the clearance between the product and the chamber walls is constant at any cross section of the chamber and the area of the clearance is the same along the entire length of the chamber; then a stream of water is passed through the chamber with a volume concentration of steam varying from 0 to 0.95, a temperature of from 160 to 370° C., at a pressure not below the saturation pressure, said stream flowing past the products at a speed not under 0.2 m./s. in the course of not less than 5 minutes.

The characteristics of the water stream depend on the composition of glass and are selected to be the best in each particular case. The speed of the water stream may be as high as desired, it may reach the speed of sound or exceed it, but in practice it should be chosen as low as possible because a reduction of speed improves the degree of glass strengthening and cuts down the water consumption. As a rule, the speed of the water stream is set at not under 0.2 m./s. since a lower speed fails to ensure a complete removal of the products of reaction from the glass together with water.

All other conditions being equal, the thickness of the glass layer being removed varies directly as the time of its treatment. Therefore, the time of treatment is selected so as to ensure the removal of the required thickness of the surface layer which, in turn, depends on the depth of surface defects of the glass products.

To produce strengthened glass with a transparent surface it is practicable that the volume concentration of steam in the water stream be equal to zero, its temperature varying from 160 to 350° C. and a pressure exceeding the saturation pressure.

The temperature of the water stream depends on the glass formula while the pressure, in turn, depends on the temperature and must be higher than the saturation pressure. The degree of this excess of pressure may be infinitely small while in practice it is recommended that the pressure should be 3 to 5 atm. higher than the saturation pressure to avoid boiling of the water. A larger degree of raising the pressure above the saturation pressure, though being possible, it is not desirable since it calls for the use of a more complicated equipment.

The same purpose can be served by the water stream with a volume concentration of steam from 0.001 to 0.95, a saturation pressure from 6 to 40 atm. or from 60 to 170 atm.

To produce strengthened glass with a light-diffusing surface it is practicable to use a water stream with a zero volume concentration of steam, a temperature of 230 to 270° C. and a pressure higher, than the saturation pressure.

The degree by which the pressure is higher should be selected as described above.

The same purpose can be served by the water stream with a volume concentration of steam of 0.001 to 0.95, and a saturation pressure of 40 to 60 atm.

The claimed method of surface treatment of glass products allows, while retaining the surface transparency, the strength of the products to be increased 10 and more times as compared with the initial strength whereas the methods known before increase the strength by 3 to 4 times only. The production of glass articles with a light-diffusing surface by the known methods sharply weakens them while these same products treated in accordance with the invention are strengthened by 5 to 6 times. The use of such a readily available reagent as water renders the process perfectly harmless and cheap and improves radically the conditions of labour. Thus, the claimed invention yields a great economical effect with simultaneous improvement of the quality of the products.

Now the invention will be described in detail by way of example with reference to the accompanying drawings, in which:

FIG. 1 illustrates a schematic diagram of an installation for surface treatment of glass products;

FIG. 2 shows a longitudinal section of a chamber for the treatment of cylindrical glass rods;

FIG. 3 shows a cross-section of the same;

FIG. 4 shows a chamber for the treatment of glass sheets, side view, with a cutaway section;

FIG. 5 shows the same, a view along arrow A in FIG. 4 with a cutaway section;

FIG. 6 shows a longitudinal section of a chamber for the treatment of tapered glass rods;

FIG. 7 shows the same, a section taken along the line VII—VII of FIG. 6;

FIG. 8 shows the same, a section taken along the line VII—VII of FIG. 6.

Let us consider the first example of the realization of the claimed method on cylindrical glass rods, of 5 mm. diameter 200 mm. long, with a transparent surface and composed of the following elements (weight percent):

$SiO_2=68.4$; $B_2O_3=18.7$; $Na_2O=4.7$; $K_2O=4.2$;
$Al_2O_3=2.9$; $CaO=0.4$; $Fe_2O_3=0.1$;
$MgO=0.4$ and $SO_3=0.2$ Each rod is placed into a separate chamber 1 (FIG. 1) which is a cylindrical tube 2 (FIGS. 2, 3) whose butt ends are provided with pins 3 for supporting the glass rod 4 in the working position in such a way, that the clearance $a$ in any cross section of the chamber between the surface of the rod being treated and the inside surface of the chamber would be constant. The tube 2 communicates with the inlet pipe 5 and outlet pipe 6 for letting the water stream in and out. A stream of water with a zero volume concentration of steam at a temperature of 271° C. and a pressure of 65 atm. is admitted into the inlet pipe 5.

The water stream is delivered from a boiler 7 (FIG. 1) and, passing through a circular gap $a$ (FIG. 3) between the inner surface of the tube 2 and the outer surface of the glass rod 4, flows past it at a speed of 0.4 m./s. The constancy of the gap $a$ along the length of the glass rod 4 ensures a constant speed of the water flow. Owing to a chemical interaction, the surface layer of the rod is destroyed.

Thanks to the tangential stresses of friction arising on the surface of the rod all the products of chemical reactions are carried away by the stream. The surface layer of the glass products has various defects (microscopic cracks, varying density, etc.) whose amount depends on the production technology and term of storage. As a rule, the quantity of defects is considerably higher in the surface layer. Therefore, the removal of the surface layer strengthens the glass and the maximum strength is attained by removing a layer whose thickness is equal to the maximum depth of the defects.

In the course of water treatment, the water stream is pumped from the outlet pipes 6 through pipes 8 (FIG. 1) back into the boiler 7 by means of a pump 9.

The treated glass rods in the first example were held in the water stream in the course of 4 hours after which the delivery of water was discontinued.

Then the glass rods were withdrawn from the chambers, the thickness of the removed layer was determined and the rods were tested for strength.

The thickness of the removed layer being 85 microns, the average strength of the treated glass rods proved to be 11.9 times higher than the initial strength and reached 170 kg./mm.², the surface remaining completely transparent.

Let us turn to another example of realization of the claimed method using the same sample rods with a view to obtaining strengthened glass with a light-diffusing surface.

The process of treatment was analogous to the one described above, in the same chambers with a water stream having a zero volume concentration of steam, though the temperature of the water stream was brought to 277.3° C., pressure was maintained at 66 atm. and the flow speed was 2–7 m./s.

After a 1-hr. treatment of the rods the thickness of the removed layer was 105 microns and the strength of the rods was 6.2 times higher than before treatment.

Let us consider the third example of realization of the claimed method on the same rods, using a water stream with a volume concentration of stream of 0.707 (that is steam-water stream), a saturation pressure of 58.3 atm. and a flow speed of 29 m./s.

The entire technology of the surface treatment of the glass rods was analogous to the one described above. However, before returning to the boiler 7, the water-steam stream was cooled in a heat exchanger 10 to a complete condensation of steam.

After a 0.5-hr. treatment the removed layer was 68 microns and the strength of the glass rods was 6 to 7 times higher than the initial one, the surface remaining completely transparent.

Using a water stream with a volume concentration of steam above zero, that is a steam-water stream, it is possible to produce strengthened glass with a light-diffusing surface.

After a 1-hr. treatment of the same glass rods with a steam-water stream with a volume concentration of steam of 0.65, a saturation pressure of 52.1 atm. and a flow speed of 26.3 m./s. the removed layer was 130 microns thick and the strength of the glass increased 5.8 times.

The methods described above are suitable for treating the products of any conceivable shape. The shape of the inside surface of the chamber with a water stream is chosen depending on the shape of the product so as to ensure a constant clearance between the inner walls of the chamber and the outer surfaces of the glass article. In case of rectangular products, for example a glass sheet 11 (FIGS. 4, 5) the chamber 12 is also of rectangular shape. Inasmuch as it is practicable to charge the chamber with several sheets 11 at a time, in this case the constant clearance $b$ is ensured not only between the wall of the chamber 12 and the sheet 11, but also between the sheets proper in order to guarantee their complete washing by the water stream.

For treating glass rods of a tapered shape, the chamber with the water stream should be made in the form of a tube 13 (FIGS. 6, 7, 8) whose inner surface has the corresponding tapered shape. The ends of the tube 13 are provided with pins 14 to support the glass rod 15 in the working position.

The tube 13 is connected by flanges 16 to the pipes 17 and 18 through which the stream of water is let in and out respectively. For treating the glass rod 15 it is placed into the chamber with a clearance in relation to the inner surface of the tube 13 so as to maintain a constant cross sectional area formed by this clearance at any lateral section along the length of the rod 15.

For instance, the cross sectional areas formed by the clearances $c$ (FIG. 7) and $d$ (FIG. 8) are equal. This ensures a constant speed of flow around the entire surface of the glass rod.

We claim:

1. A method of surface treatment of glass products, wherein a glass article is placed with a clearance into a chamber whose inside surface is so shaped that at each cross section of the chamber the size of said clearance is constant around the entire perimeter and the clearance area along the entire length of the chamber is the same, then a stream of water is passed through the chamber with a volume concentration of steam from 0 to 0.95, a temperature of 160 to 370° C. and a pressure not less than the saturation pressure, said stream of water flowing past the article with a velocity not below 0.2 m./s. and the article is hled in this chamber for at least 5 minutes.

2. A method according to claim 1, wherein the high-strength glass with a transparent surface is produced by the use of a water stream with a zero volume concentration of steam, a temperature of 160 to 350° C. and a pressure above the saturation pressure.

3. A method according to claim 1, wherein the high-strength glass with a transparent surface is produced by the use of a water stream with a volume concentration of steam from 0.001 to 0.95 and a saturation pressure of 6 to 60 atm.

4. A method according to claim 1, wherein the high-strength glass with a transparent surface is produced by the use of a water stream with a volume concentration of steam from 0.001 to 0.95 and a saturation pressure from 60 to 170 atm.

5. A method according to claim 1 wherein the high-strength glass with a light-diffusing surface is produced by the use of a water stream with a zero volume concentration of steam and a pressure above the saturation pressure.

6. A method according to claim 1 wherein the high-strength glass with a light-diffusing surface is produced by the use of a water stream with a volume concentration of steam from 0.001 to 0.95 and a saturation pressure of 40 to 60 atm.

References Cited

UNITED STATES PATENTS

| | | | |
|---|---|---|---|
| 2,312,597 | 3/1943 | Somes | 65—116X |
| 3,023,139 | 2/1962 | Van Tetterode | 65—31X |
| 3,228,760 | 1/1966 | Jack et al. | 65—114X |

ARTHUR D. KELLOGG, Primary Examiner

U.S. Cl. X.R.

65—31, 116